Jan. 8, 1924. 1,480,204
C. T. HANSEN
DRAFT EVENER
Filed July 5, 1921 2 Sheets-Sheet 1
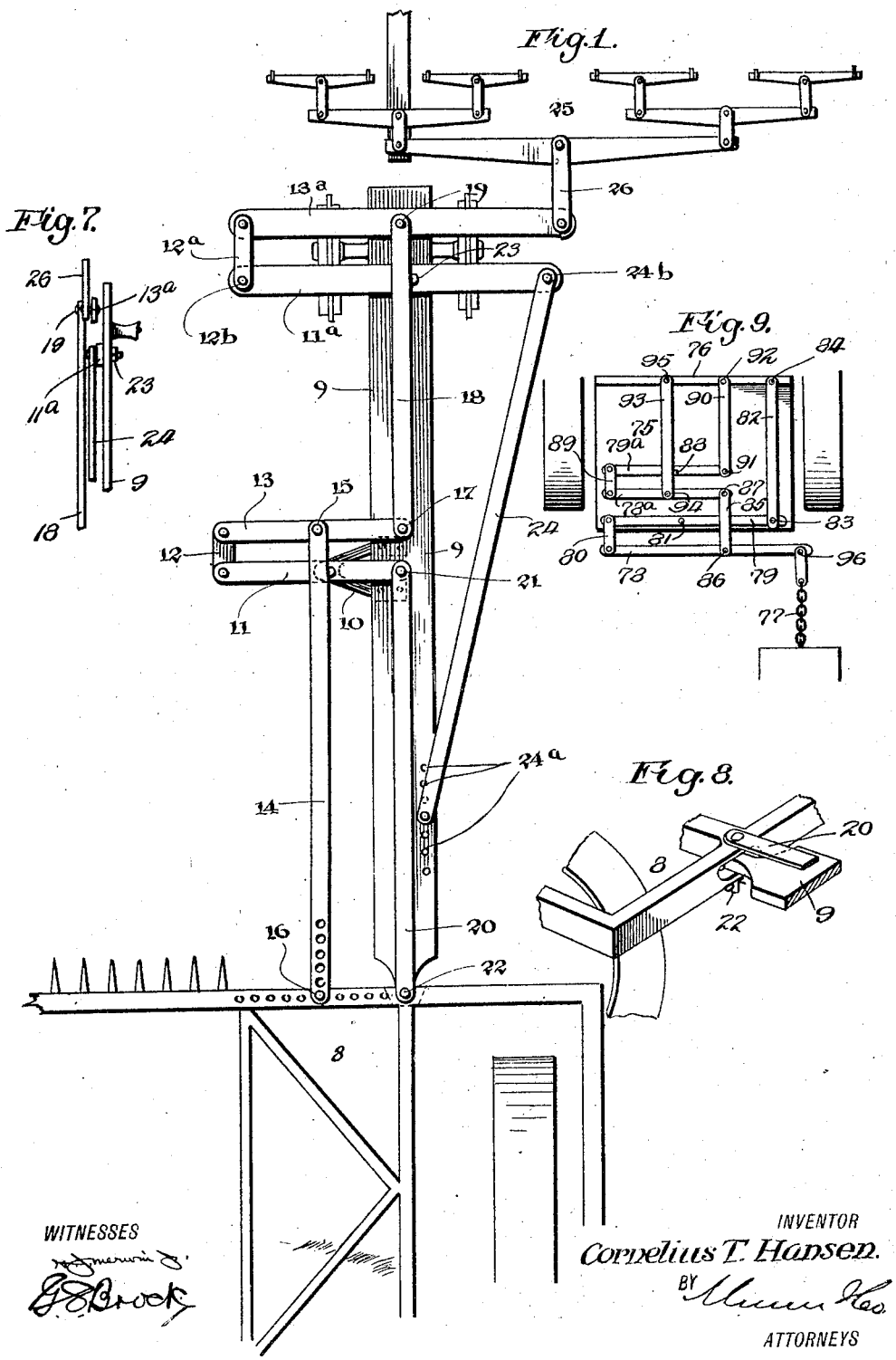

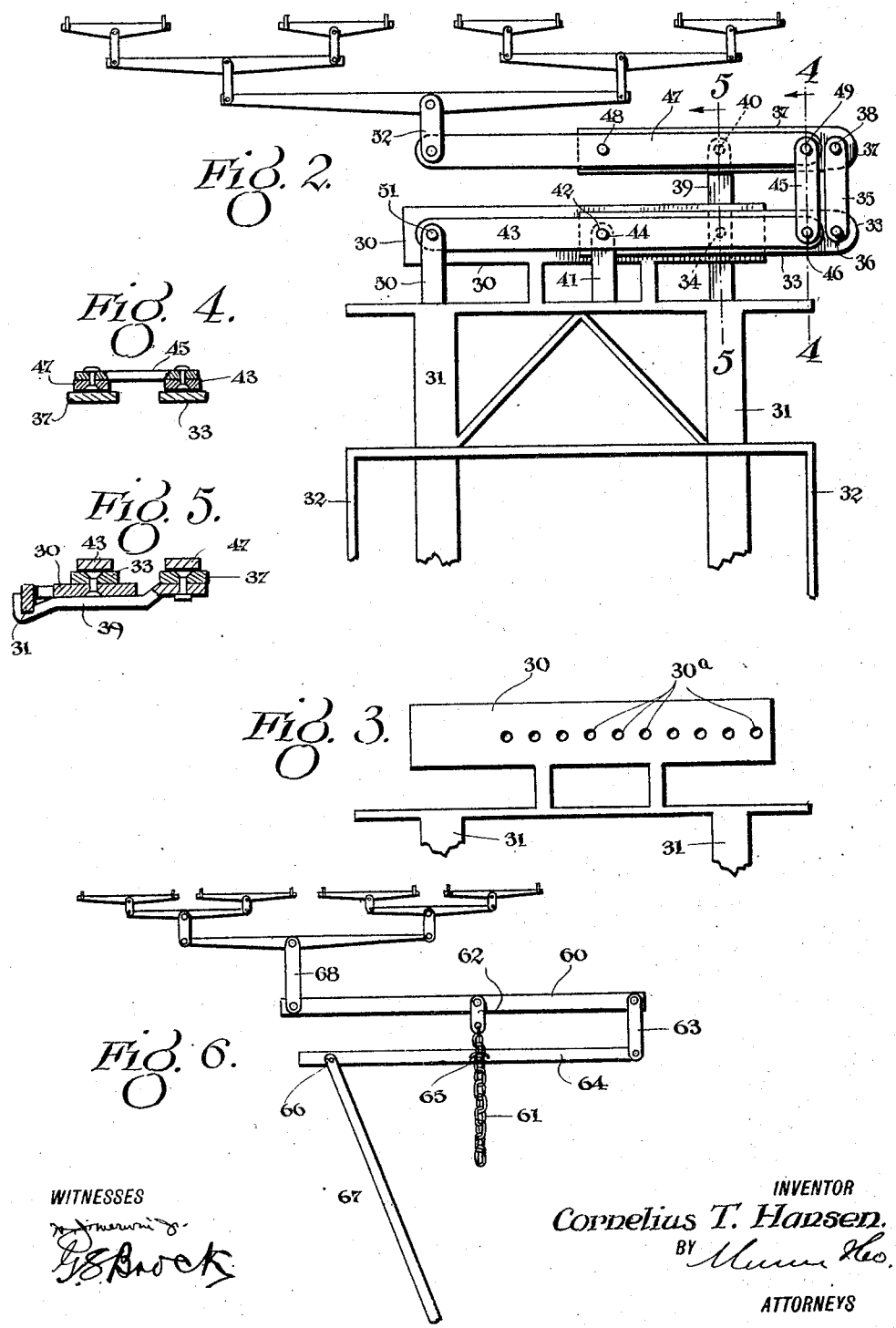

Patented Jan. 8, 1924.

1,480,204

UNITED STATES PATENT OFFICE.

CORNELIUS T. HANSEN, OF BIG SANDY, MONTANA.

DRAFT EVENER.

Application filed July 5, 1921. Serial No. 482,445.

*To all whom it may concern:*

Be it known that I, CORNELIUS T. HANSEN, a citizen of the United States, and a resident of the city of Big Sandy, in the county of Chouteau and State of Montana, have invented certain new and useful Improvements in Draft Eveners, of which the following is a full, clear, and exact description.

This invention relates to draft eveners or equalizers and is designed as an improvement upon the draft evener or equalizer disclosed in my Patent No. 1,187,311, dated June 13, 1916.

The main object of the present invention is to equalize, overcome, minimize and eliminate side draft.

Another object is to provide an equalizer adapted for attachment to a grain harvester and binder, or any other farm implement, vehicle, tractor, plow, road grader, road drag or any other machine or implement to be drawn by horses, oxen, tractor or other mode of draft.

With these and other objects in view and which will become apparent as the description proceeds, the invention consists in the construction, arrangement and combination of parts as will be hereinafter pointed out in the claims, reference being had to the accompanying drawings, forming a part hereof and in which:

Figure 1 is a plan view of an equalizer constructed in accordance with my invention, showing the same in use with a four-horse evener of the common type, and attached to a grain harvester and binder, Figure 2 is a plan view showing how my invention may be utilized with a gang plow, Figure 3 is a fragmentary detail view in plan showing the draw bar or clevis of the arrangement shown in Figure 2, Figure 4 is a section on line 4—4 of Fig. 2, Figure 5 is a section on line 5—5 of Fig. 2, Figure 6 is a partial plan view showing a modification, Figure 7 is a fragmentary view in side elevation of the parts of the draft evener located at the forward end of the tongue;

Figure 8 is a fragmentary perspective view, illustrating the connection of the tongue to the tractor frame; and Figure 9 is a plan view showing the invention adapted for use on a tractor.

Referring more particularly to Fig. 1 a grain harvester is indicated at 8 and the stub-pole of the same is indicated at 9. 10 is a steel extension or bracket rigidly secured to the stub pole and on this bracket is pivotally secured at its center a lever 11. To the outer end of the lever 11, one end of a link 12 is connected, the other end of said link being connected to one end of a draw bar 13 disposed parallel with lever 11. A steel rod 14 is connected at one end to the draw bar 13, as at 15, and its opposite end which is provided with a number of perforations is adjustably connected to the harvester frame, as indicated at 16. Connected to the free end of draw bar 13 as at 17 is a steel bar 18, and at its other end fastened to the draw bar 13ª at about the center, as indicated at 19.

Another steel bar 20 is fastened at one end to lever 11 as at 21 and at its opposite end to the frame, as at 22. Lever 11ª is pivoted centrally to the stub-pole 9 at 23, and one end of the lever is connected to link 12ª the other end of which is connected to the outer end of draw bar 13ª. To the opposite end of the draft lever 11ª is pivoted one end of a steel rod 24 the other end of the rod being adjustably connected to the stub pole by means of the series of openings and a bolt 24ª.

To the free end of draw bar 13ª is connected an ordinary four-horse evener 25 by a link 26.

It should be understood that draw bar 13ª is not fastened to the stub-pole at point 19, it being fastened only to the steel rod 18 at the point 19. It will be also noted that by the above arrangement of parts I provide that one horse is to be placed on the grain or left hand side of the pole, and three horses on the right, or other side of the pole. Upon a pull in the direction of travel being imparted to the outer end of the drawbar 13ª through the medium of link 26 and the four horse evener of common construction, the inner end of draw bar 13ª will tend through the medium of the link 12ª to shift arm or lever 11ª backwardly at the point 12ᵇ and to pivot at point 23 and forwardly at 24ᵇ where it is connected to the steel rod 24, which is connected at its rear end to the stub pole 20; this imparts a forward pull on the harvester and binder and the steel rod 24 can be shifted to meet the needs and requirements to equalize the draft on the harvester.

It should be noted that the steel rod 18 is connected to the draw bar 13ᵃ at substantially its center, as indicated at 19, the drawbar 13ᵃ having no connection with the stub pole at this point and that the other end of steel rod 18 is connected to one end of drawbar 13; this will through the medium of the elements just described impart a forward pull on the harvester frame at 22 and 16 through the rods 14 and 20.

The steel rod 14 can be adjusted according to the needs and requirements necessary to minimize and eliminate any side draft as indicated at 16.

To utilize my invention with a gang plow the principle of operation is the same as above set forth, the difference being mainly in the arrangements shown whereby the direction of pull through the various parts is reversed and the connections shortened according to the needs and practicability of operation of the different machines, such as tractors.

In this embodiment of the invention a cross clevis of a common construction is indicated at 30, and the plow beams are indicated by 31, and the plow frame by 32. A lever 33 is pivotally connected to the cross clevis 30 at point 34 and the link 35 connected to the lever 33 at 36 and again connected to the draw bar 37 at 38. The steel rod or connection 39 is fastened to the drawbar 37 at 40, and again to the plow beam as indicated. The steel rod or connection 41 is fastened to the lever 33 at 42 and projects from the plow beam.

Lever 43 is fastened pivotally to the cross clevis 30 at 44 and the link 45 is fastened to the lever 43 at 46 and to the draw bar 47 which is attached pivotally to draw bar 37 at 48 and the link 45 at 49; the connection 50 is connected at one end to lever 43 at 51, and at the other end to the plow beam and connection 52 is attached to the outer end of draw bar 47 and connected to the four horse evener of common construction, thus permitting one horse to walk in the furrow and three or four horses on the unplowed land.

To utilize the invention to a tractor the construction and relative arrangement of the parts is practically the same as in the gang plow as just described, the only difference being that the equalizer is attached to the draw bar of the tractor instead of to the cross clevis, both of which have the adjustment holes 30ᵃ and permits the tractor to move and operate on the solid unplowed land and extending the pull on the plow to the side of the tractor, thus minimizing and eliminating the side draft on the plow and the tractor.

In Figure 9 a tractor platform is indicated at 75 and the tractor draw bar at 76; a chain or other suitable means to which the plows are attached is indicated at 77; a draw bar is indicated at 78; a transfer-lever is indicated at 79; a link connecting the draw bar to the transfer lever is indicated at 80. The transfer-lever 79 is pivotally fastened to the platform at 81. A pull rod is fastened to the transfer-lever 79, as indicated at 83, and again to the draw bar 76 as indicated at 84. A link 85 is fastened to the draw bar 78, as indicated at 86, and again to the draw bar 78ᵃ, as indicated at 87. A transfer-lever 79ᵃ is pivotally fastened to the tractor platform, as indicated at 88 and is connected to the draw bar 78ᵃ by a link 89. A pull rod 90 is fastened to the transfer-lever 78ᵃ, as at 91, and again to the tractor draw bar, as at 92. A third pull rod 93 is fastened to the draw bar 78ᵃ, as at 94 and again to the tractor draw bar 76, as at 95.

Thus, by imparting a pull on the tractor the resistance or load to be pulled is at the plows, or at the point on the draft eveners indicated at 96. Thus, the draft on the tractor as applied through the medium of my device will be found to be as follows:

At the point of draw bar 78, indicated at 96 the full pull on this device is obtained. At the other end of the draw bar 78 where the link 80 is connecting the draw bar 78 with transfer-lever 79 the action is reversed and backwardly, and as the transfer-lever 79 is pivotally fastened to the tractor platform at 81 the action is again reversed and forward at 83 where it is fastened to pull rod 82 and to the tractor draw bar at 84. Since the link 85 connects the draw bar 78 to the draw bar 78ᵃ a similar action on the part of the draw bar 78ᵃ, its transfer lever 79ᵃ and the associated elements is had whereby the full pull of the tractor is through the medium of my device, divided into seven equal parts, and four parts of the whole pull of the tractor is applied to link 11ᵃ at 13ᵃ, and two parts of the whole pull of the tractor is applied to the link 8ᵃ at 10ᵃ, and one part of the whole pull of the tractor is applied to the link 5 at 7. It will be noticed from my invention and explanations thereof, that the pull on the tractor is about from the center, and the point where the plows are attached or other implements to be pulled has been set over to the side of the tractor as indicated at the point 96 or chain 79.

In Figure 6 I have shown another embodiment of my invention as attached to a four horse evener. In this form of device 60 indicates the draw bar having secured to the same at about its center a chain or other flexible element 61 by means of the clip 62 and a link 63 is connected at one end to one end of the draw bar 60 and at its other end to transfer lever 64, at 65, the transfer lever is pivoted on the improvement used. Adjacent that end of transfer lever 64 which is remote from the end connected to link 63, the transfer lever is attached, at 66, to any suitable pull means such as a rod 67 which may be on the implement and used.

The four horse evener is connected to this last described form by the link 68, as in the other forms.

I claim:—

1. A draft equalizer assembly comprising a draw bar and a draft lever arranged in parallel relation, said draw bar and lever having a link connection at one end, means for connecting the other end of the draw bar to a four horse evener, pull means acting from the center of said draw bar on the implement drawn and pull means acting from the free end of said draft lever on the implement drawn.

2. A draft equalizer assembly comprising pull transposing members, such members disposed in pairs in parallel relation, each pair comprising a draw bar and a centrally pivoted draft lever, said bars and levers having a link connection at one end, means for adjustably connecting such assembly to a draft implement and to a four horse evener, and means for transferring the pulling force of the evener to the implement through said pairs.

3. A draft equalizer comprising in combination draft translating members disposed in pairs in parallel relation and each of such members comprising a centrally pivoted draft lever and a draw bar spaced therefrom, said draw bars pivotally connected at one end to one end of said draft levers by links, and connected at their other ends to draft rods, and other draft rods having connection with said draw bars at their longitudinal centers.

4. The combination with an agricultural implement, of a draft bar, of a draft equalizer comprising a supporting member, a series of draft transferring levers and draw bars, the levers and draw bars disposed in pairs and in parallel relation, the corresponding ends of the levers and draw bars flexibly connected by links, the levers centrally pivoted on the aforesaid support, the free ends of the levers pivotally connected to draft or pull bars connected with the implement being drawn, and the free ends and centers of the draw bars pivotally connected with other draft bars, whereby the pull from the four horse evener coupled to one of said draw bars is translated and equalized to the implement being drawn.

5. A draft equalizer comprising a pair of draft translating members disposed in parallel relation and each of said members comprising a central pivoted draft lever and a draw bar, the draw bars and draft lever of each member being pivotally connected at one end, the end of the draw bar of one member being connected to the draw bar of the other member intermediate its ends, pull means acting from the end of each draft lever, pull means acting from the central portion of the draw bar the end of which is connected to the intermediate portion of the draw bar of the other member and means for connecting the end of said last mentioned draw bar to a four horse evener or the like.

6. A draft equalizer comprising a pair of draft translating members disposed in parallel relation and each of said members comprising a central pivoted draft lever and a draw bar, the draw bars and draft lever of each member being pivotally connected at one end, the end of the draw bar of one member being connected to the draw bar of the other member intermediate its ends.

CORNELIUS T. HANSEN.